US010645666B2

(12) United States Patent
Song et al.

(10) Patent No.: US 10,645,666 B2
(45) Date of Patent: May 5, 2020

(54) SYSTEM AND METHOD FOR RADIO NODE LOCATION

(71) Applicant: Corning Optical Communications LLC, Charlotte, NC (US)

(72) Inventors: Ruibin Song, Fremont, CA (US); Tsung-Yi Chen, San Jose, CA (US); Olivier Duval, Sunnyvale, CA (US); Paresh Bhaya, Los Gatos, CA (US)

(73) Assignee: Corning Optical Communications LLC, Charlotte, NC (US)

(*) Notice: Subject to any disclaimer, the term of this patent is extended or adjusted under 35 U.S.C. 154(b) by 149 days.

(21) Appl. No.: 15/471,114

(22) Filed: Mar. 28, 2017

(65) Prior Publication Data

US 2018/0288601 A1 Oct. 4, 2018

(51) Int. Cl.
*H04W 64/00* (2009.01)
*H04W 24/02* (2009.01)
*H04W 24/10* (2009.01)
*H04W 4/90* (2018.01)

(52) U.S. Cl.
CPC ......... *H04W 64/003* (2013.01); *H04W 24/02* (2013.01); *H04W 4/90* (2018.02); *H04W 24/10* (2013.01)

(58) Field of Classification Search
CPC ... H04W 8/005; H04W 24/10; H04W 64/003; H04W 4/22; H04W 4/90; H04W 24/02
See application file for complete search history.

(56) References Cited

U.S. PATENT DOCUMENTS

| | | | |
|---|---|---|---|
| 9,582,943 B1* | 2/2017 | Morrison | G07C 5/008 |
| 2002/0155815 A1* | 10/2002 | Richter | H04W 48/16 455/67.11 |
| 2015/0358477 A1* | 12/2015 | Jeong | H04M 15/56 370/259 |
| 2016/0143065 A1* | 5/2016 | Gupta | H04W 4/90 455/404.2 |
| 2016/0159196 A1* | 6/2016 | Shin | B60H 1/00735 165/202 |
| 2016/0261986 A1* | 9/2016 | Nord | H04W 4/023 |

\* cited by examiner

*Primary Examiner* — Steven S Kelley
(74) *Attorney, Agent, or Firm* — C. Keith Montgomery (57) ABSTRACT

Systems and methods disclosed detect significant changes in the RN topology after an E-RAN system has been installed and provisioned. If a significant change is detected, the operator is notified through an alarm, and the operator can take action to correct it. For example, an RN whose location was moved may be disabled. Alternatively, the movement operation may be approved and the alarm cleared so long as the operation falls within certain approved guidelines or categories, e.g., is appropriately reported and a new location noted.

23 Claims, 10 Drawing Sheets

| DetectingCellHd1 | DetectedCellHd1 | ZoneID | EARFCN | PCI | ECGI | RSRP |
|---|---|---|---|---|---|---|
| 1 | 2 | 0 | 900 | 201 | XXX | -101 |
| 1 | 65538 | 0 | 900 | 301 | XXX | -90 |
| 1 | 65539 | 1 | 2175 | 401 | XXX | -79 |
| ... | ... | | | | ... | |
| 2 | 1 | 1 | 900 | 202 | XXX | -102 |

Score = f1 () + f2 () + f3 ()

f1 () = sum (RSRPMap (ABS (old RSRP - new RSRP)))     for all top n neighbor per EARFCN from baseline that also exist in new scan result RSRPMAP (RSRPDELTA) = MaxAllowedRSRPOffset     if RSRPDelta >= maxallowedrsrpoffset otherwise
               = MAX (0, RSRPDelta - MaxAllowedRSRPOffset/2 + 1)

With MaxAllowedRSRPoffset set to 10, RSRPmap returns 10, 10, 5, 4, 3, 2, 1, 0 for RSRPDelta 11, 10, 9, 8, 7, 6, 5, 4
With MaxAllowedRSRPoffset set to 16, RSRPmap returns 16, 16, 8, 7, 6, 5, 4, 3, 0 for RSRPdelta 17, 16, 15, 14, 13, 12, 11, 10, 9, 8, 7 f2 () = MaxAllowedRSRPoffset     if any top n neighbor per EARFCN from baseline doesn't exist in new scan result and it's RSRP is equal or above the value RSRP_filter=0
       otherwise RSRP_filter = max co-channel neighbor RSRP - CLi parameter     CoChannelRSRPFilteroffset f3 () = MaxallowedRSRPoffset     if any top n neighbor per EARFCN from scan result doesn't exist in baseline and it's RSRP is equal or above the value of RSRP_filter=0 a. it's an external cell and CLI parameter UseNewExternalNeighbor is TRUE or b. it's an internal cell and CLI parameter UseNewExternalNeighbor is TRUE RSRP_filter = max co-channel neighbor RSRP - CLI parameter CoChannelRSRPFilterOffset

FIG. 7

NEW CLI parameters mentioned in above sections are listed below:

Object: FAPService. (i). FAPControl LTE.X_002448_Selfconfig.RadioNodeLocationLock

| Parameter | SCW-Type | SCW-Default | Required | |
|---|---|---|---|---|
| Enable | Boolean | FALSE | Y | //Enable/Disable the Feature |
| UseExternalNeighbor | Boolean | FALSE | Y | //Whether to consider external neighbor |
| UseNewExternalNeighbor | Boolean | FALSE | Y | //Whether to consider new external neighbor that doesn't exist in baseline |
| UseNewInternalNeighbor | Boolean | TRUE | Y | //Whether to consider new internal neighbor that doesn't exist in baseline |
| MinNeighborRSRP | unsignedint [-120:-70] | -100 | Y | //The minimal RSRP of the neighbors that will be considered |
| Strictness | unsignedint [1:10] | 2 | Y | //Number of top neighbors per EARFCN are considered |
| CoChannelRSRPFilterOffset | unsignedint [5:30] | 10 | Y | //Defines the low boundary of RSRP from max co-channel neighbor rsrp that a neighbor will be considered for a new |
| MaxAllowedRSRPOffset | unsignedint [3:20] | 10 | Y | //Max allowed RSRP offset without trigger alarm |
| RNOutofServiceDuration | unsignedint [300:1200] | 300 | Y | //The minimal out-of service duration that triggers RN location check |
| MaxLocationCheckrnNumber | unsignedint [5:100] | 8 | Y | //The maximal RN numberthat can go through location check |

CLI Commands
NEW CLI commands mentioned in above sections are listed below:

request lte self-config rn-location-check [RNHandle xxxx] [ZoneID xxxx]    //manually trigger location check for one RN, all RNs in a zone, or all RNs in E-RAN show RFMgmt LTE RNLocationLockBaseline [CellHandle xxxx]    //Display Neighbors in baseline request lte self-config clear rn-relocation-check [RNHandle xxxx] [zoneid xxxx]    //manually clear rn relocation alarm for one RN, all RNs in a zone, or all RNs in E-RAN request lte self-config clear rn-relocation-check -required-alarm    //manually clear RN location check required alarm TBD:
request lte self-config rn-location-baseline-create  RNHandle xxxx    //re-create baseline for one single RN by putting cells on the RN into netmon state

FIG. 8

ALARMS

| ALARM NAME | RELATED EVENTS | DESCRIPTION | CORRECTIVE ACTION |
|---|---|---|---|
| RFMGMT_RN_RELOCATED | ENTER EVENT: RFMGMT_RN_RELOCATED<br><br>EXIT EVENT: RFMGMT_RN_RELOCATED_CLEAR | WHEN A RN IS DETECTED AS RELOCATED, EVENT RFMGMT_RF_RELOCATED IS SENT OUT AS ALARM.<br><br>WHEN A RN PASSED LOCATION CHECK AND IT'S PREVIOUSLY MARKED AS LOCATION MOVED, EVENT RFMGMT_RF_RELOCATED_CLEAR IS SENT OUT TO CLEAR ALARM. | 1. IF RN's LOCATION HAS BEEN CHANGED WITHOUT OPERATOR'S APPROVAL, MOVE RN BACK TO IT'S ORIGINAL LOCATION. WHEN RN COME BACK INTO SERVICE, A NEW LOCATION CHECK WILL CLEAR ALARM<br>2. IF RN''s LOCATION HAS BEEN CHANGED WITH OPERATOR'S APPROVAL, RUN REM TO RE-CREATE BASELINE AND RUN CLI COMMAND TO MANUALLY CHECK LOCATION OF AFFECTED RN<br>3. IF RN's LOCATION HAS NOT BEEN CHANGED, BUT EXTERNAL MACRO CHANGE CAUSED MIS-DETECTION, RUN REM TO RE-CREATE BASELINE, AND RUN CLI COMMAND TO MANUALLY CHECK LOCATION OF AFFECTED RN<br>4. IF RN's LOCATION HAS NOT BEEN CHANGED, BUT VARYING RF ENVIRONMENT CAUSED MIS-DETECTION, EITHER:<br>A. RUN CLI COMMAND TO MANUALLY CLEAR ALARM<br>OR<br>B. ADJUST STRICTNESS AND MaxAllowedRSRPOffset UNDER RadioNodeLocationLock IN DATA MODEL TO REDUCE THE CHANCE OF MIS-DETECTION, AND RUN CLI COMMAND TO MANUALLY CHECK LOCATION OF AFFECTED RN |
| RFMGMT_RN_LOCATION_CHECK_REQUIRED | ENTER EVENT: RFMGMT_RN_LOCATION_CHECK_REQUIRED<br><br>EXIT EVENT: RFMGMT_RN_LOCATION_CHECK_REQUIRED_CLEAR | WHEN THE MEMBER OF RNs THAT REQUIRE LOCATION CHECK IS MORE THAN THE VALUE OF MaxLocationCheckRNNumber, EVENT RFMGMT_RN_LOCATION_CHECK_REQUIRED IS SENT OUT TO ALARM OPERATOR TO RUN MANUAL LOCATION CHECK IN A MAINTENANCE WINDOW.<br><br>WHEN A MANUAL LOCATION CHECK IS STARTED, EVENT RFMGMT_RN_LOCATION_CHECK_REQUIRED IS SENT OUT TO CLEAR ALARM | 1. RUN CLI COMMAND TO MANUALLY CHECK LOCATIONS OF RNs<br><br>OR<br><br>2. RUN CLI COMMAND TO MANUALLY CLEAR THIS ALARM |

FIG. 9

| MSGID | GROUPS | LEVEL | INCLUDED INFORMATION | DESCRIPTION |
|---|---|---|---|---|
| RFMGMT_RN_RELOCATED | RFMGMT | MAJOR | 1. RN ID<br>1. LTE CELL IDs<br>3. NEIGHBORS IN BASELINE THAT ARE NOT FOUND DURING LOCATION CHECK<br>AND/OR<br>NEIGHBORS IN NEW SCAN RESULT ARE NOT FOUND IN BASELINE<br>AND/OR<br>NEIGHBORS WITH RSRP CHANGE IS OUT OF MAX ALLOWED RANGE AND | INDICATES A RN's LOCATION HAS CHANGED |
| RFMGMT_RN_RELOCATED_CLEAR | RFMGMT | MINOR | 1. RN ID | INDICATES A RN's LOCATION CHANGE HAS BEEN CORRECTED |
| RFMGMT_RN_LOCATION_CHECK_REQUIRED | RFMGMT | MAJOR | 1. RN ID LIST (UP TO MAX ALLOWED EVENT STRING LENGTH) | INDICATES A MANUAL RN LOCATION CHECK IS REQUIRED |
| RFMGMT_RN_LOCATION_CHECK_REQUIRED_CLEAR | RFMGMT | MINOR | N/A | INDICATES REQUIRED MANUAL RN LOCATION CHECK HAS BEEN FULFILLED |
| RFMGMT_RN_LOCATION_CHECK_START | RFMGMT | INFO | 1. RN ID LIST (UP TO MAX ALLOWED EVENT STRING LENGTH) | INDICATES RN LOCATION CHECK HAS STARTED |
| RFMGMT_RN_LOCATION_CHECK_COMPLETE | RFMGMT | INFO | 2. RN ID LIST (UP TO MAX ALLOWED EVENT STRING LENGTH) | INDICATES RN LOCATION CHECK HAS COMPLETED |

FIG. 10

SYSTEM AND METHOD FOR RADIO NODE LOCATION

FIELD

The invention relates to locating radio equipment for emergency purposes.

BACKGROUND

Operators of mobile systems, such as Universal Mobile Telecommunications Systems (UMTS) and its offspring including Long Term Evolution (LTE) and LTE-Advanced, continue to rely on advanced features for improving the performance of their radio access networks (RANs).

In some deployments of E-RANs, the radio nodes (RNs) are associated with location information. This location information can be used to locate a particular user equipment (UE) inside of a building. In a particular operator's deployment, the operator may wish to avoid the case where the RN is moved to a different location by a customer, even if the different location is still within the building. The reason is that such location information is sometimes used by an operator to locate a UE in the case where emergency personnel are being dispatched to a location in response to an emergency 911 (E-911) call. If the RN has been moved, the emergency personnel may be dispatched to an incorrect location.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. In particular, systems and methods according to present principles detect significant changes in the RN topology after an E-RAN system has been installed and provisioned. If a significant change is detected, the operator is notified through an alarm, and the operator can take action to correct it. For example, an RN whose location was moved may be disabled. Alternatively, the movement operation may be approved and the alarm cleared so long as the operation falls within certain approved guidelines or categories, e.g., is appropriately reported and a new location noted.

In one aspect, the invention is directed towards a method for determining if a radio node has been relocated, including: a. for a set of radio nodes connected to a services node, causing a first scan to be performed with respect to a subject radio node to determine a baseline set of transmission characteristics of neighboring radio nodes, the first scan measuring at least one transmission characteristic of a neighboring radio node with respect to the subject radio node; b. detecting if a radio node has been off-line for greater than a first predetermined duration of time, and if the radio node has not been off-line for greater than a first predetermined period of time, then determining that the radio node has not been relocated; c. if the radio node has been off-line for greater than the first predetermined duration of time, then, once the radio node is back online, causing a second scan to be performed by the local radio node, the second scan measuring at least one transmission characteristic of a neighboring radio node; and d. if the result of the second scan differs significantly from the result of the first scan, where the results of the first scan are used corresponding to the baseline set of transmission characteristics of neighboring radio nodes with respect to a subject radio node identified as the radio node that has been off-line for greater than a predetermined duration of time, then determining that the radio node that has been off-line for greater than a predetermined duration of time has been relocated.

Implementation of the invention may include one or more of the following. If the radio node has been determined to have been relocated, then the method further includes rendering an alert or alarm indicating the relocated radio node. The first predetermined duration of time may be between three and ten minutes. The second scan may start following a second predetermined duration of time, the second predetermined duration of time measured from the time that the radio node comes back online. The second predetermined duration of time may be between one and five minutes. The second scan may be performed such that successive ones of the set of radio nodes are configured to transmit while each other of the set is configured to not transmit but to measure a result of the transmission. The second scan may be performed such that successive ones of the set of radio nodes are configured to receive or measure the result of transmissions while each other of the set is configured to transmit or radiate power. The transmission characteristic may be selected from the group consisting of measurement report messages in 3GPP/3GPP2 specifications. The transmission characteristic may be RSRP, RSCP, or RSSI, or a combination of these, e.g., where the radio node supports both UMTS and LTE, and the method may further include adjusting a threshold value of a RSRP, RSCP, or RSSI filter (or the filter can be a combination of these, or multiple single-purpose filters may be employed) to trade-off between a probability of generating false alarms and a probability of detection. The first scan, or the second scan, or both, may include measurements of signal power from an external macrocell/picocell/femtocell. Where multiple types of filters are employed, multiple respective thresholds may also be employed.

In another aspect, the invention is directed towards a non-transitory computer readable medium, including instructions for causing a computing environment to perform the above method.

In a further aspect, the invention is directed towards a system for determining if a radio node has been relocated, including: a. a scanner configured to perform a first scan, such that the scanner, for a set of radio nodes connected to a services node, causes the first scan to be performed with respect to a subject radio node to determine a baseline set of transmission characteristics of neighboring radio nodes, the first scan measuring at least one transmission characteristic of a neighboring radio node with respect to the subject radio node; b. a detector, the detector for detecting if a radio node has been off-line for greater than a first predetermined duration of time; c. the scanner, further configured to, if the radio node has been off-line for greater than the first predetermined duration of time, then, once the radio node is back online, configured to cause a second scan to be performed by the local radio node, the second scan measuring at least one transmission characteristic of a neighboring radio node; and d. a signal transmitter configured to, if the result of the second scan differs significantly from the result of the first scan, where the results of the first scan are used corresponding to the baseline set of transmission characteristics of neighboring radio nodes with respect to a subject radio node identified as the radio node that has been off-line for greater than a predetermined duration of time, transmit a signal indicating that the radio node that has been off-line for greater than a predetermined duration of time has been relocated.

Implementations of the invention may include one or more of the following. The detector may include a clock circuit. The first predetermined duration of time may be between three and ten minutes. The scanner may be configured such that the second scan starts following a second predetermined duration of time, the second predetermined duration of time measured from the time that the radio node comes back online. The second predetermined duration of time may be between one and five minutes. The scanner may be configured such that the second scan is performed in such a way that successive ones of the set of radio nodes are configured to transmit while each other of the set is configured to not transmit but to measure a result of the transmission. The scanner may be configured such that the second scan is performed in such a way that successive ones of the set of radio nodes is configured to receive or measure the result of transmissions while each other of the set is configured to transmit or radiate power. The transmission characteristic may be selected from the group consisting of measurement report messages in 3GPP/3GPP2 specifications. The transmission characteristic may be RSRP, RSCP, or RSSI, or a combination of these, as determined by the transmission schemes being used, e.g., UMTS, LTE, and so on. In a particular implementation, the transmission characteristic may be RSRP, and the second scan may employ a RSRP, RSCP, or RSSI filter that is adjusted to vary a trade-off between a probability of generating false alarms and a probability of detection. The scanner may be configured such that the first scan, or the second scan, or both, include measurements of signal power from an external macrocell/picocell/femtocell.

Advantages of the invention may include, in certain embodiments, one or more of the following. Systems and methods allow identification of location in indoor settings, for which GPS is often difficult, due to variations in environments caused by walls, materials, cubicles, and the like. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 9 illustrates exemplary alarms.

Like reference numerals refer to like elements throughout. Elements are not to scale unless otherwise noted.

DETAILED DESCRIPTION

Figure 1:
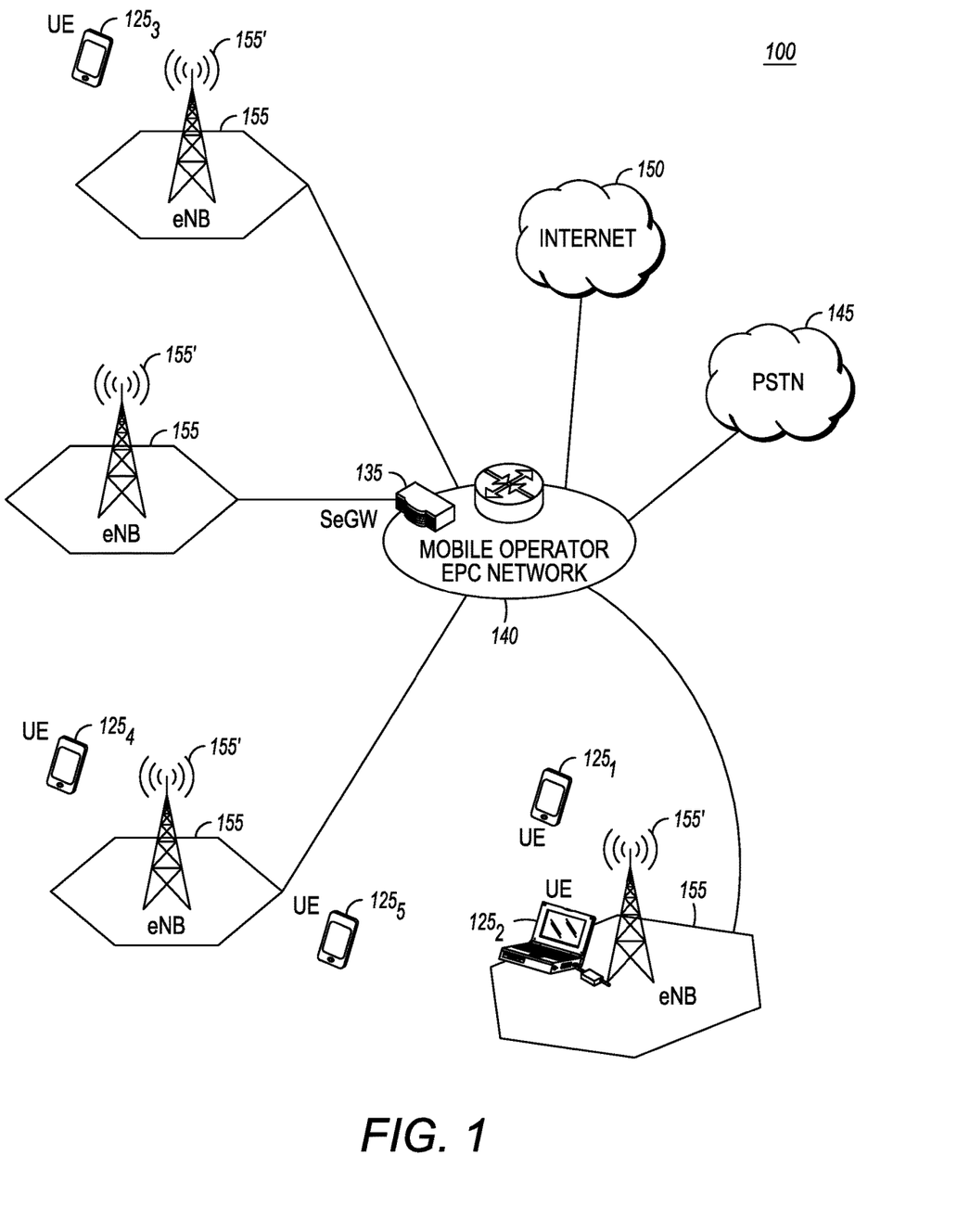
FIG. 1 shows an illustrative mobile telecommunications environment in which systems and methods according to present principles may be practiced, in particular a general arrangement including eNodeBs and user equipments.
Figure 2:
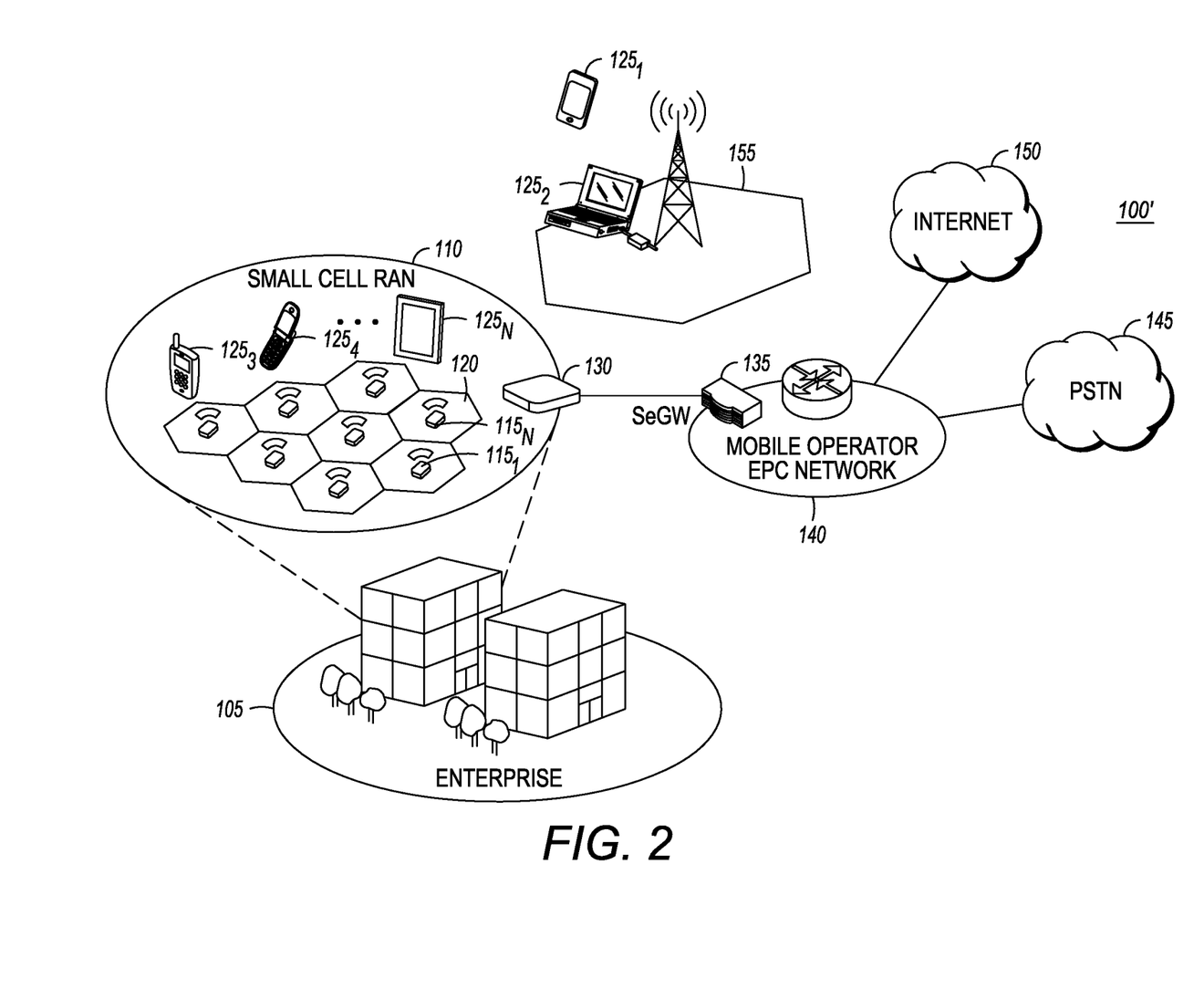
FIG. 2 shows another illustrative mobile telecommunications environment in which systems and methods according to present principles may be practiced, in particular related to small cell RANs.

FIG. 1 shows an illustrative mobile telecommunications environment 100 in which the present invention may be practiced. The mobile telecommunications environment 100, in this illustrative example, is arranged as an LTE system as described by the Third Generation Partnership Project (3GPP) as an evolution of the GSM/UMTS standards (Global System for Mobile communication/UMTS). It is emphasized, however, that the present principles described herein may also be applicable to other network types and protocols. For example, other network types and protocols that may be employed include, without limitation HSPA, LTE, CDMA2000, GSM, IEEE 802.11/Wi-Fi, 802.16 etc. or a mixture of technologies such as with a multi-standard radio (MSR) node (e.g., LTE/HSPA, GSM/HS/LTE, CDMA2000/LTE, etc). For example, referring to FIG. 2, an implementation within small cell RANs is described.

Referring to FIG. 1, the environment 100 may include a number of cells 155, each generally including an Evolved Node B (eNB) base station 155', as shown. A given user equipment (UE) 125 (shown as UE $125_1$-$125_5$) generally achieves connectivity to a mobile operator EPC network 140 through the cell 155 in the environment 100. The mobile operator EPC network 140 is typically configured to communicate with a public switched telephone network (PSTN) 145 to carry circuit-switched traffic, as well as for communicating with an external packet-switched network such as the Internet 150.

As noted, in some implementations, the mobile telecommunications environment 100' may include a small cell RAN. In this case, and referring to FIG. 2, the environment 100' includes an enterprise 105 in which a small cell RAN 110 is implemented. The small cell RAN 110 includes a plurality of RNs (radio nodes, or, base stations) $115_1$ . . . $115_N$. Each RN 115 has a radio coverage area (graphically depicted in the drawings as a hexagonal shape) that is commonly termed a small cell. A small cell may also be referred to as a femtocell. Using terminology defined by 3GPP, the small cell Radio node may also be referred to as a Home Evolved Node B (HeNB). In the description that follows, the term "cell" typically means the combination of a base station and its radio coverage area unless otherwise indicated. A representative cell is indicated by reference numeral 120 in FIG. 2.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as UEs and indicated by reference numerals $125_{1-N}$ in FIG. 1-2). However, the foregoing is intended to be illustrative and the solutions described herein can be typically expected to be readily scalable either upwards or downwards as the needs of a particular usage scenario demand.

In this particular illustrative example, the small cell RAN 110 includes one or more SNs (represented as a single SN 130 in FIG. 2) that manage and control the RNs 115. In alternative implementations, the management and control functionality may be incorporated into a RN, distributed among nodes, or implemented remotely, i.e., using infrastructure external to the small cell RAN 110. The RNs 115 are coupled to the SN 130 over a direct or local area network (LAN) connection typically using secure IPsec tunnels. In alternative implementations, the connection between the RNs 115 and SN 130 may be over a wireless link or wireless local area network (W-LAN) connection. The SN 130 aggregates voice and data traffic from the RNs 115 and provides connectivity over an IPsec tunnel to a security gateway SeGW 135 in an Evolved Packet Core (EPC) 140 network of a mobile operator.

Implementations of present principles will now be discussed. Many implementations of systems and methods according to present principles may be advantageously employed in virtually any cellular mobile system.

As noted above, systems and methods according to present principles generally relate to enterprise RANs, or E-RANs, which generally include a services node (SN) and several radio nodes (RNs), and the same generally operate as part of an enterprise LAN or DMZ. A services node is also referred to as an SC SN, CPE, access controller, or just AC. A radio node is also referred to as SCRN an access point, or just AP.

In one implementation, systems and methods according to present principles use the radio node and the services node in the following way. The services node is employed as an information aggregator to determine if one of the radio nodes has changed its location away from an original location. In so doing, the services node monitors the local environment and attempts to detect changes in the same. Such aspects are significantly different than localization per se of a particular UE.

Figure 3:
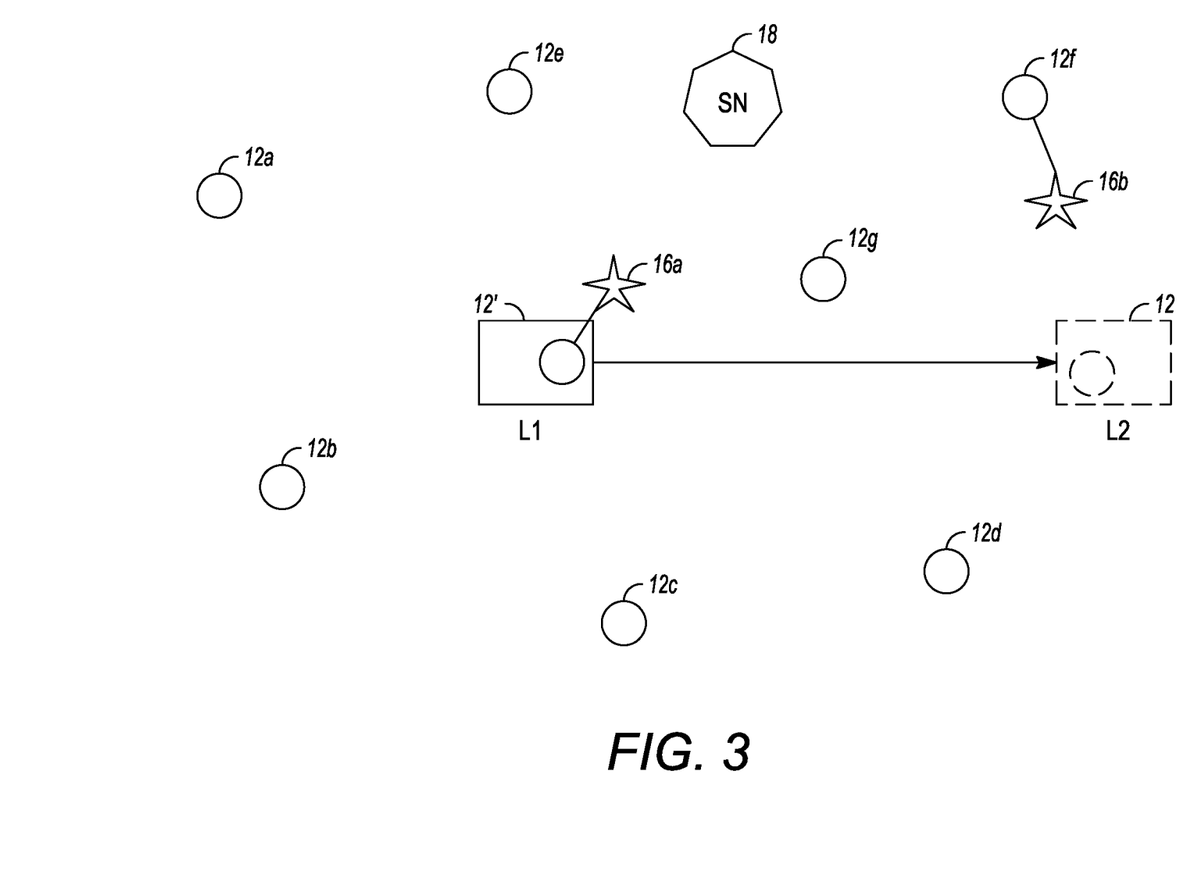
FIG. 3 is an exemplary schematic layout of an arrangement of radio nodes in which present systems and methods may be implemented.

Referring to FIG. 3, a number of radio nodes 12*i* are pictured with a particular radio node 12' illustrated as serving a UE 16*a*. UE 16*b* is being served by RN 12*f*. The radio nodes are associated with a services node 18 as described above. For example, the radio nodes may report parameters and statistics to the services node 18.

If however the radio node 12' is moved from location L1 to location L2, then systems and methods according to present principles may be employed to detect the same and to notify the operator. This may happen, e.g., if an RN is moved by the E-RAN owner to better serve UEs or for other purposes.

In one implementation, in moving a radio node from L1 to L2, it will generally be necessary to unplug an network cable, e.g., ethernet cable, remove power, and so on, from the radio node equipment at location at L1 and reinstate the same after the radio node equipment is moved to location L2. Thus, when such a change is made, the services node 18 may detect that the radio node 12' has temporarily not reported statistics and parameters.

In one implementation, an RN may be marked as "location check required" when it is registered as not being present for more than a first prespecified or predetermined duration of time. For example, if the time from OOS-NOTPRESENT (out of service, not present) to OOS-INIT (out of service, initialized) is greater than the specified duration, and there is at least one enabled LTE cell configured on it. The duration can be changed through the CLI parameter RNOutOfServiceDuration and a default value may be, e.g., 300 seconds.

The statistics and parameters corresponding to the local environment may then be scanned in known fashion, e.g., power levels from neighboring RNs may be detected and stored, and then compared from the time the radio node 12' was located at location L1 to the time the radio node 12' became located at location L2. For the former data, historical environmental statistics and parameters may be employed. If a change is seen, then it may be inferred that the location of radio node 12' has changed and needs to be reported to the operator. For example, at location L2, it is likely that radio node 12' will not be able to detect radio node 12*a*, or at least the signal from the same will be significantly weakened. On the other hand, the signals from radio nodes 12*d* and 12*f* will have increased. In general, the detected transmitted power from the array of RNs will be different.

Figure 4:
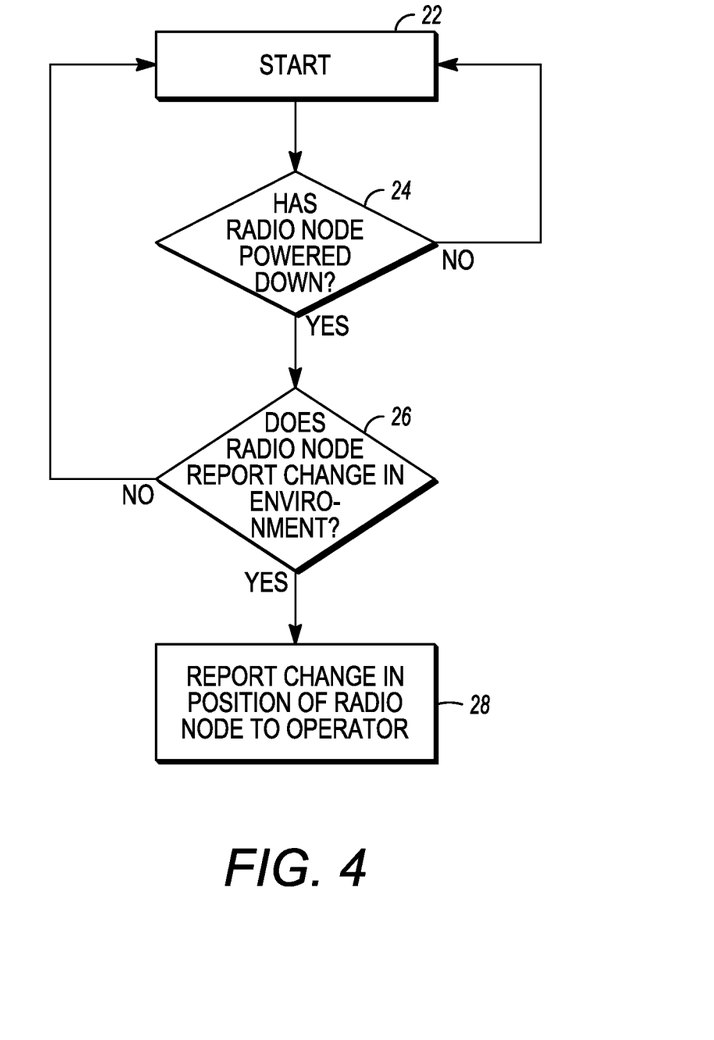
FIG. 4 is a flowchart of a simplified method according to present principles.

FIG. 4 illustrates a flowchart corresponding to a simplified exemplary method implementing the above principles. After a start step (step 22), an initial step in this simplified procedure is to determine if a radio node has been powered down (step 24). If not, flow begins again at the beginning. If so, test(s) may be performed as described below to determine if the radio node reports a change in its environment (step 26). If not, it may be assumed that the radio node simply underwent a temporary power off condition. However, if the radio node reports a change in its environment, then the change may be reported to the operator or to another managing entity (step 28). Details of detecting changes in the environment of an RN are described below.

When a change in location of an RN is detected, an alarm may be provided. The alarm may include relevant information to help identify the relocated RN. Exemplary alarms are described in FIG. 9, and include notifications of relocation, notifications that a check is required, and so on.

Figure 5:
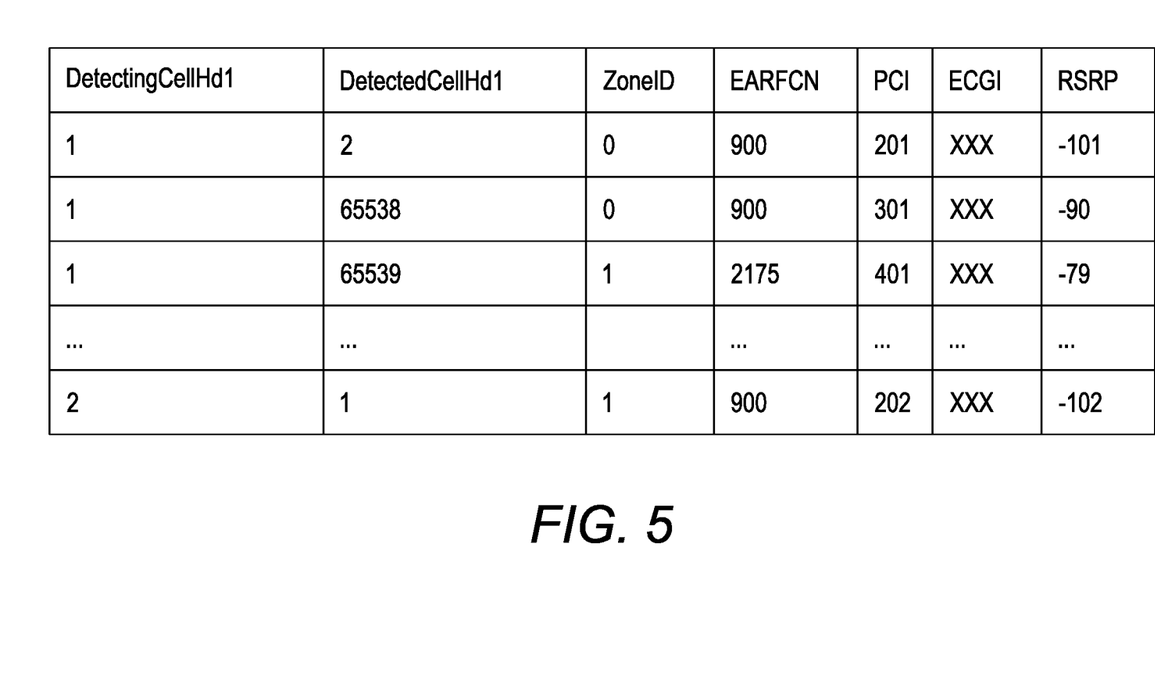
FIG. 5 is table indicating exemplary transmission parameters.

Additional details are now provided. Referring to FIG. 5, an exemplary simplified virtual baseline of RF topology is depicted. The same generally provides a subset of a detected neighbor table/detected external tables/internal LTE cell table. The virtual table of FIG. 5 stores all first-tier detected relationships between detected LTE internal cell to LTE internal cell as well as LTE internal cell to LTE external cell. In this implementation, no GSM or UMTS neighbors are included. For any internal to internal relationship, both directions generally exist in the table. For example, a direction of cell 1 going to cell 2 and also a direction of cell 2 going to cell 1. If one direction is missing, it may be copied from the other direction to maintain symmetry. As may be seen from FIG. 5, for every cell combination an RSRP may be measured, providing a fingerprint or characteristic signature, effectively locating (in a relative sense) an RN within an array.

As there may be no real baseline table in the database, and it is only a subset of detected neighbor tables/detected external tables/internal LTE cell table, it may be updated after every RF topology scan. The RF topology is generated from an initial scan, and this initial scan is used as a baseline.

This baseline RF topology is generally kept permanent unless reset by the operator. The baseline RF topology is reliable because it leverages a centralized access controller to orchestrate a coordinated neighbor discovery: the access controller instructs one RN in the network at a time to radiate at maximum transmit power while all other RNs listen at the same duration and determines the subset of the RNs in the network that can hear the RN that is transmitting. This process repeats until all RNs or a subset of the RNs have finished transmitting]. A separate copy of the RF topology is updated according to the latest neighbor discovery results. Such an initial scan to establish a baseline is termed a "first scan".

In certain implementations only internal neighbors are employed for location checks. However, in other implementations, external neighbors may be used as well, especially for centralized SN deployments. A user interface may be employed in current systems and methods to perform various functions, including to enable or disable the use of external neighbor information for location checks, and in this implementation a command line interface or CLI is used. In this case, the CLI parameter UseExternalNeighbor may be provided to control whether to use external neighbors for location checks.

The CLI Show command may be provided to list baseline neighbors for a location check. Although the baseline DB table includes all first-tier neighbors in some implementations, only the top N neighbors per EARFCN of a cell may be employed for comparison, and only these top N neighbors per EARFCN may be listed out in the CLI Show command. The CLI parameter strictness may be provided to specify the value of N. The metric to determines the top N neighbors can be based on, for example, the RSRP of the neighbors, the relative difference between the RSRP of each neighbor versue the weakest neighbor, etc.

Figure 6:
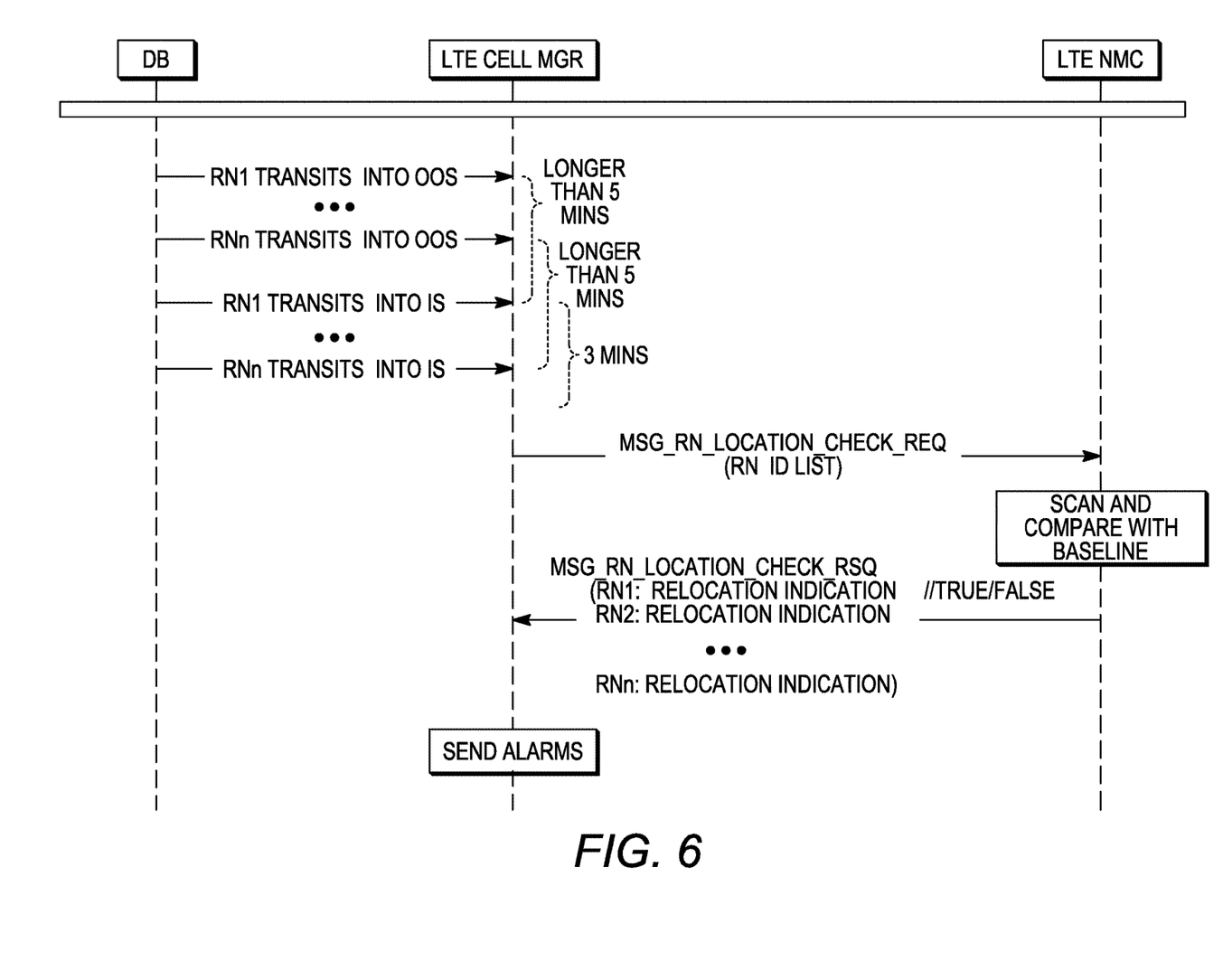
FIG. 6 is a sequence diagram indicating flow of an exemplary method according to present principles.

FIG. 6 illustrates an exemplary sequence diagram showing an exemplary message flow. In particular, the figure shows multiple RNs transiting into an out-of-service (OOS) state as well as transitioning into an in-service (IS) state. For example, RN1 enters an out-of-service state and then goes back into an in-service state after a period of time, in this implementations a period of time exceeding five minutes. This first predetermined duration of time is used as a measure after which it will be deemed possible for a radio node to have changed location. In the described implementation, the first predetermined duration of time may be set for five minutes, but may be changed by the installer or customer or operator according to the needs of the deployment. Other RNs (RNn) are also shown as being without power for longer than five minutes.

After RN1 is back in service, a second predetermined duration of time occurs, e.g., three minutes. RN1 may then scan (this is also termed a "second scan") its local environment to determine if changes have occurred. The purpose of the second predetermined duration of time is to allow other RNs who may have been moved or undergone power outages, e.g., RNn, to be brought back online. Within the second predetermined duration of time, the services node may continue to monitor whether there are any other radio nodes that are designated as requiring a location check.

At the end of the second predetermined duration, if the number of radio nodes that require a location check is more than the value of, e.g., CLI parameter MaxLocationCheck-RNNumber, an alarm is sent out to alert operators about an out-of-service state of multiple RNs and the same may further suggest a service-impacting manual location check. A CLI command may be provided to trigger this manual location check. Without the second predetermined duration of time, unnecessary errors may be detected in the deployment, which errors may have been obviated if all of the deployed RNs were allowed to be powered up.

As seen in the figure, following the first and second predetermined durations of time, an RN location check may be run, at which each RN detects statistics and parameters of its local environment, e.g., detected power as transmitted from detectable radio nodes. In more detail, if at the end of the second predetermined duration of time, the number of radio nodes that require a location check is equal to or less than the value of CLI parameter MaxLocationCheckRN-Number, then a scanning process may commence involving all radio nodes that require a location check. If after the scanning process starts, there are new radio nodes being marked as "location check required", these new radio nodes may be placed into a waiting queue. They may then undergo a new scanning process after the current scanning process is complete, so long as the number of radio nodes in the waiting queue is no more than the value of MaxLocation-CheckRNNumber. Otherwise, an alert or alarm may be sent out as discussed above.

The scan may not only be of current transmission characteristics but may also involve comparing the same with a baseline that was measured previously. A "per cell" score may be calculated based on the baseline, the new scan result, and CLI parameters. If the score of any LTE cell on a radio node is equal to or less than the value of the CLI parameter MaxAllowedRSRPOffset, that radio node may be deemed to be in the same location (non-relocated). Otherwise, if all LTE cells on the radio node fail the check, an alarm may be rendered for the radio node to notify the operator about the radio node's determined relocation with related neighbor information.

The calculation of the score may exclude all neighbors from the baseline and the new scan result that RSRP is lower than a user interface parameter MinNeighborRSRP. The MinNeighborRSRP may be set to, e.g., −100, by default. The term "top N neighbors" in this description refers to the top N neighbors per EARFCN in terms of RSRP for neighbors that have RSRP at least MinNeighborRSRP from either the new scan result or the baseline.

Figure 7:
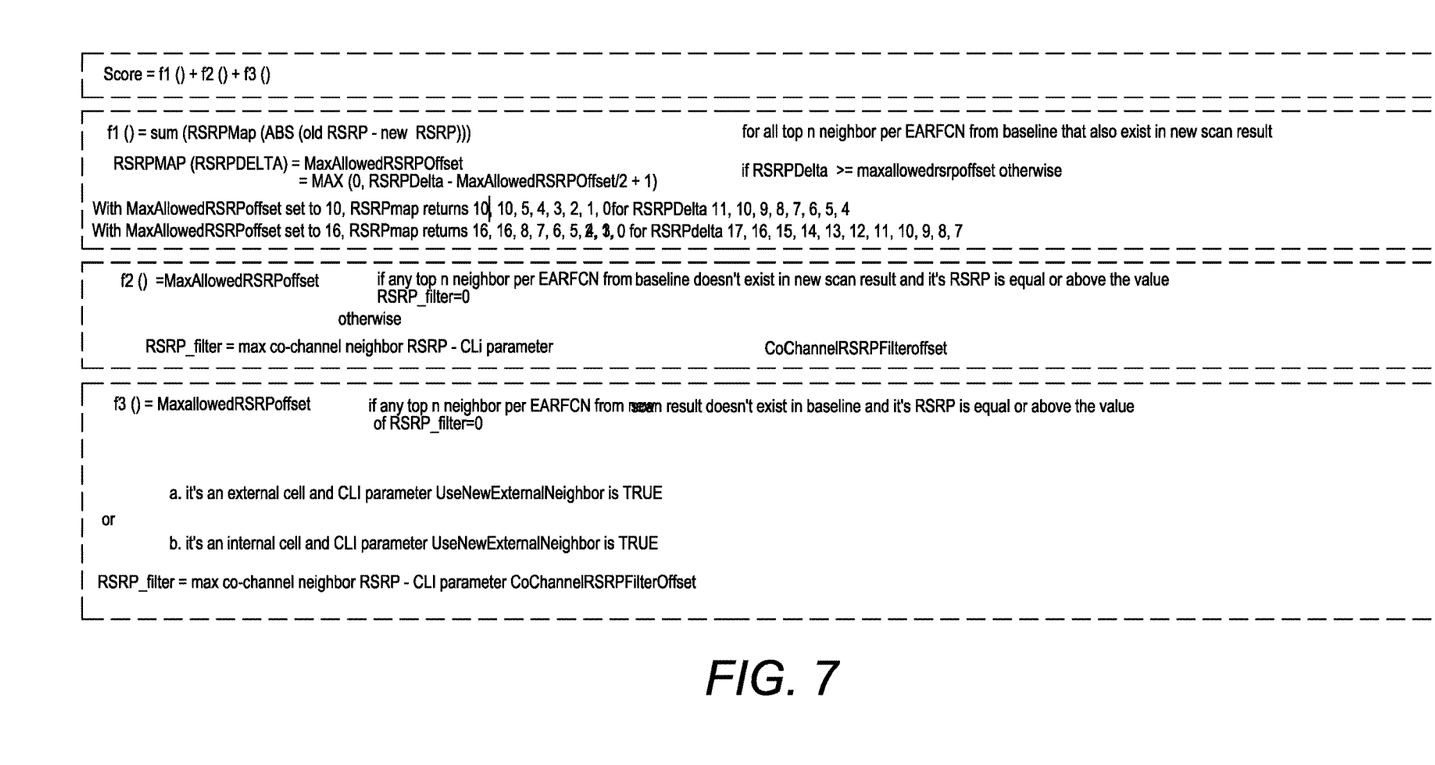
FIG. 7 is an exemplary identification scheme, contemplating a "score", using which variations in radio node locations may be detected.

In particular, a "score" for each LTE cell may be calculated in the manner according to FIG. 7, which illustrates an exemplary identification scheme, in which variations in radio node locations may be detected.

In this example, the calculation of the score includes three different parts: f1( ), f2( ), and f3( ). The first part f1( ) considers how the power measured from neighboring radio nodes changes from the baseline scan to a current (trigger) scan. In one implementation, and as illustrated in the figure, a power change can be mapped or "bucketed" to a category of changes. In one variation, a dramatic power change may be seen with respect to a particular radio node and such could signify an RN relocation. In another implementation, it could be that a small or lesser dramatic change is seen with respect to multiple radio nodes, and such may again indicate that an RN relocation has occurred. Other variations will also be understood.

f2( ) generally corresponds to whether any neighbors from the baseline scan do not appear in a new scan result. In this consideration of neighbors, generally the neighbors that are counted are those having a threshold level of power measured, where the threshold corresponds to RSRP_Filter=max cochannel neighbor RSRP−CoChannel-RSRPOffset.

However, in some cases, a neighbor radio node may appear to "disappear", but such disappearance only appears because the RN has a neighbor RN that radiates very strongly. If this situation is measured and determined, then such a disappearing neighbor need not be counted in the calculation of f20. Equivalently, a check may be performed as to whether all of the measured neighbors are reasonably close in their received power strength, such that one does not overpower the others. For example, if cells differ in their received power by more than a predetermined threshold, e.g., 10 dB, then even though the weaker cell may still be there, subsequent scans may not allow its distinction as an individual separate cell, and it may not be able to be detected.

f3( ) considers the situation in which new neighbors are found in a trigger scan. The appearances of new neighbors is often a good indication that a radio node has been relocated. The admission of new neighbors in the trigger scan may be filtered out based on the RSRPs, e.g., whether the RSRP of the new neighbors are above MinNeighborRSRP, or whether the detect RSRP is smaller than the max RSRP among the existing neighbors for more than for example, 10 dB.

Typically the initial RF scan is performed in a way without interference from internal cells. For example when an internal cell is scanning external cell or other internal cells, it is generally guaranteed that there is no any internal cell is transmitting on the scanned channel (EARFCN for example). However, there are some exceptions for this, for example after a site is deployed, new RNs may be added to the system without bringing down existing RNs (to avoid service interruption) for a complete initial RF scan. Also, for a new scan process during a location check, RNs not involved in the location check remain transmitting. With internal RNs transmitting on the scanned channel, the interference may reduce detection performance and lead to false alarms. The threshold RSRP_filter mentioned earlier can deal with this as it filters out neighbors that have large signal offset from max co-channel neighbors.

Continuing a description of the results of score calculations, as a result of f1( ), a neighbor from baseline with RSRP change (from the baseline scan result) more than MaxAllowedRSRPOffset will trigger an alarm. Multiple neighbors from baseline with RSRP change less then MaxAllowedRSRPOffset may trigger alarm if the sum of changes on these neighbors exceeds a certain predetermined level. For example, if MaxAllowedRSRPOffset is set to 10 dB, and the RSRP of the top two neighbors all changed 9 dB, the RSRPMap function will return 5 for both neighbors, and make the score score 10, which will trigger an alarm. As another example, if Strictness (the parameter N is selecting the top N neighbors) is set to 3 and the RSRP of the top three neighbors all changed 8 dB, the RSRPMap function will return 4 for all three neighbors, which make the score 12 and again trigger the alarm. Here the false alarm probability is being increased somewhat, resulting in better detection probability.

In variations, the comparison may consider that internal cells may be deleted/disabled or changed as measured by PCI, ECGI, etc. In the case of internal neighbor cells being deleted/disabled, selecting the top N baseline neighbors per EARFCN should skip such internal neighbors, i.e., should choose the top N neighbors per EARFCN from enabled internal neighbors and all external neighbors or a subset of external neighbors based whether the system can recognize the operator. Also, if UseExternalNeighbor is set to FALSE, selecting the top N baseline neighbors per EARFCN should skip external neighbors. This option avoids false alarms trigger by other operators changing the network topology and/or adding new cells nearby.

The scanning process may be delayed, e.g., if SN is busy for other RF management activities like ANR. In a particular implementation, radio nodes that are out-of-service due to a services node reboot need not be marked as "location check required".

In some implementations, RNs served by a single SN could be splitted into multiple subsets, also termed zones. This splitting can be based on, e.g., geographical proximity or RF characteristics. For example, if there are two buildings served by a single SN, it is possible that RNs in one building are put into the $1^{st}$ subset and RNs in another building are put into the $2^{nd}$ subset. In this case each RN belongs to one single subset. However there are cases where it may be desired to put an RN into multiple zones, e.g., an RN that is located in the middle of the two buildings. In that case, an RN will scan external neighbors and internal neighbors defined in each zone it belongs to.

Internal topology scans may be different as compared to those in a typical REM procedure, as it is generally not desired to bring down the service of radio nodes that are not involved in the location check. Internal topology here refers to a cell scanning intra-frequencies of the zone for internal cell neighbors. Note that a zone may have multiple intra-frequencies since a cell in it may be configured with a cell level EARFCN. In this case, generally all frequencies in the zone should be scanned.

The scanning of each individual RNs may be performed in a coordinated manner, as RNs generally cannot transmit and scan at the same time. In other words, if two RNs are scanning at the same time, each will not detect the other. In one implementation of a coordinated scanning mode, one RN may be placed in receiving or measuring mode while the rest of the RNs are in transmitting or radiating mode. The one RN that is non-radiating then measures a baseline set of values from all of the neighboring radio nodes. In another implementation of a coordinated scanning mode, one RN may be selected to be placed in transmission mode, and each of the other RNs will then attempt to detect it and store a record of the measured received signal from the subject RN. This step may then be repeated for each of the other RNs.

In one implementation, the baseline or initial scan is performed such that the only one RN is radiating or transmitting, and all of the rest are listening or measuring the signal from the radiating/transmitting RN. Each RN to be measured may then be subsequently tested in this way. In this same implementation, subsequent scans, e.g., to determine if an RN has moved, also termed "trigger scans", are performed such that all RNs but one are transmitting, and the one RN that is not transmitting is performing the measuring. Again, each RN to be measured may then be subsequently tested in this way. In this case, in the second type of test, the signal-to-noise ratio is lower, because there are many transmitters, and for each particular RN to be measured, the signal-to-noise ratio is subsequently decreased. In other words, the measurements are more noisy, and the performance is lower.

In more detail, after each cell completes its intra-frequency external scan, inter frequency external scan, and internal topology scan in the zone it belongs to, a separate topology scan may be started for all LTE cells on involved radio nodes. Each cell may be activated, e.g., put into IS-IDLE, in turn to radiate, and the rest of the cells try to detect the radiating cell. Generally, if four or more radio nodes are involved, there will be no ambiguity or degeneracy with respect to position, and the location of each radio node can be unambiguously determined.

EXAMPLE

RN1: LTE cell 1 and LTE cell 101
RN2: LTE cell 2 and LTE cell 102
RN3: LTE cell 3 and UMTS cell 3

In this example, RN1, RN2, and RN3 have been marked as "location check required".

In this example, LTE cell 1, LTE cell 2 and LTE cell 3 belongs to LTE zone 1. This zone is configured to scan intra-frequency external cell and internal topology only. LTE cell 1 and LTE cell 2 also belong to LTE zone 2. This zone is configured to scan inter-frequency external cell only. LTE cell 101 and LTE cell 102 belong to LTE zone 3. This zone is configured to scan intra-frequency external cell, inter-frequency external cell, and internal topology.

With the above configuration, the following describes what scan each cell will go through.

LTE cell 1 and LTE cell 2 will have the following scans: intra-frequency external scan configured on zone 1, internal topology scan on zone 1, inter-frequency external scan configure on zone 2 and internal topology scan on zone 2. LTE cell 3 will have the following scans: intra-frequency external scan configured on zone 1 and internal topology scan one zone 1. LTE cell 101 and LTE cell 102 will have the following scans: intra-frequency external scan configured on zone 3, inter-frequency external scan configured on zone 3 and internal topology on zone 3.

After all of the above scans are performed, a coordinated topology scan may be performed for LTE cell 1, LTE cell 2, LTE cell 3, LTE cell 101 and LTE cell 102. As described above, cell is put into an IS-IDLE state in turn to radiate and rest cells are used to listen and measure the detected signal.

Figure 8:
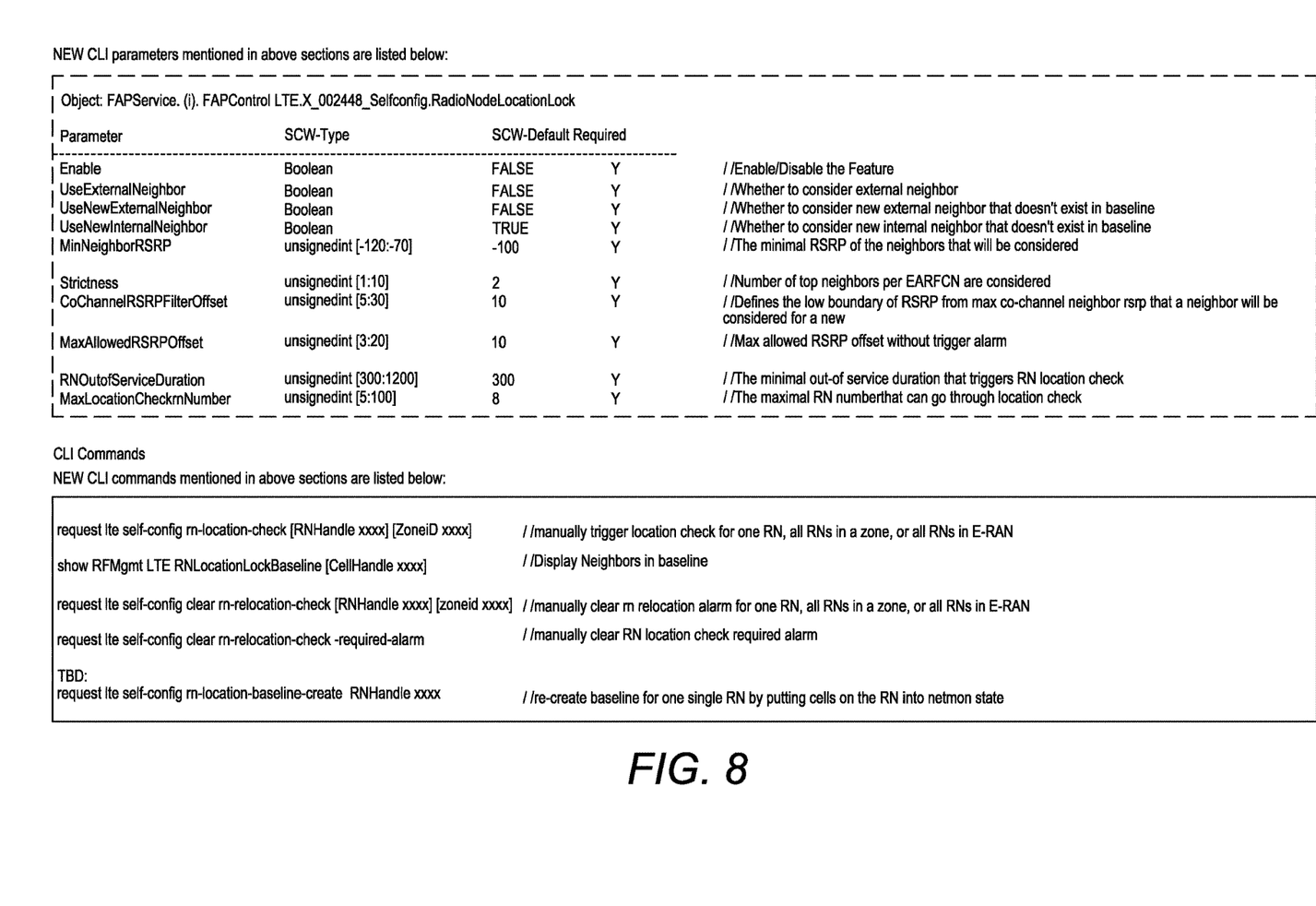
FIG. 8 indicates exemplary CLI parameters and commands.
Figure 10:
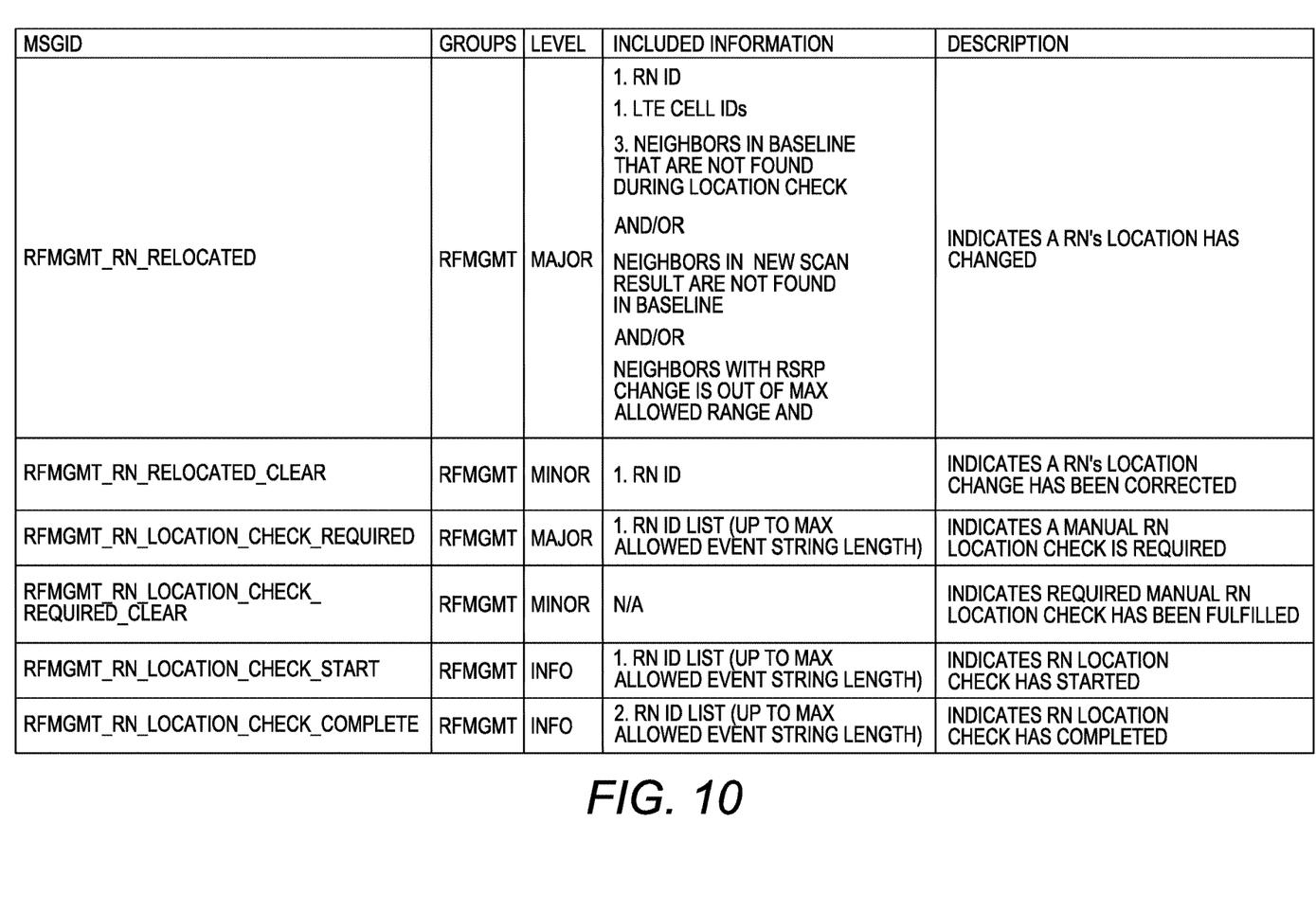
FIG. 10 illustrates exemplary events.

FIG. 8 indicates exemplary systems parameters and commands. These are exemplary of parameters that may be employed to detect location changes of radio nodes. The figure also shows exemplary commands that can be used. FIG. 9, as noted above, illustrates exemplary alarms. FIG. 10 illustrates exemplary events that may be logged according to the scheme described above.

What has been described are systems and methods of identifying or detecting changes in radio node location, i.e., "fingerprinting" an RN configuration or array and then detecting for changes in the fingerprint. The system and method are configured to rule out or minimize false alarms, as well as to improve the detection probability. In an implementation, systems and methods can group radio nodes and perform a coordinated subsequent scan to detect such changes and minimize false alarms.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi—connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method. In the disclosed system where radio node location identification schemes are contemplated, the plural inputs may allow plural users to input relevant data at the same time.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable non-transient media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Variations of the above described systems and methods will be understood to one of ordinary skill in the art given this teaching.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for determining if a radio node has been relocated, comprising:
   a. for a set of radio nodes connected to a services node, causing a first scan to be performed with respect to a subject radio node to determine a baseline set of transmission characteristics of neighboring radio nodes, the first scan measuring at least one transmission characteristic of a neighboring radio node with respect to the subject radio node;
   b. detecting if a radio node has been off-line for greater than a first predetermined duration of time;
   c. causing a second scan to be performed with respect to the radio node when the radio node has been off-line for greater than the first predetermined duration of time, the second scan being performed once the radio node is back online, the second scan measuring at least one transmission characteristic of a neighboring radio node; and
   d. determining that the radio node that has been off-line for greater than the first predetermined duration of time has been relocated by performing the steps of:
      identifying a number (N) of neighboring radio nodes to compare changes in the at least one transmission characteristic;
      calculating a score based on a number of new radio nodes found in the second scan which were not found in the first scan and based on a number of radio nodes not found in the second scan which were found in the first scan and based on a change of the at least one transmission characteristic for one or more of the neighbor nodes between the first scan and the second scan; and
      determining that the radio node has been relocated when the score is greater than a predetermined threshold.

2. The method of claim 1, wherein if the radio node has been determined to have been relocated, then further comprising rendering an alert or alarm indicating the relocated radio node.

3. The method of claim 1, wherein the first predetermined duration of time is between three and ten minutes.

4. The method of claim 1, wherein the second scan starts following a second predetermined duration of time, the second predetermined duration of time measured from the time that the radio node comes back online.

5. The method of claim 4, wherein the second predetermined duration of time is between one and five minutes.

6. The method of claim 1, wherein the second scan is performed such that successive ones of the set of radio nodes are configured to transmit while each other of the set of radio nodes is configured to not transmit but to measure a result of the transmission.

7. The method of claim 1, wherein the second scan is performed such that successive ones of the set of radio nodes are configured to receive or measure a result of transmissions while each other of the set of radio nodes is configured to transmit or radiate power.

8. The method of claim 1, wherein the at least one transmission characteristic is selected from the group consisting of measurement report messages in 3GPP/3GPP2 specifications.

9. The method of claim 8, wherein the at least one transmission characteristic is Reference Signal Received Power (RSRP), Received Signal Code Power (RSCP), or Received Signal Strength Indication (RSSI), or a combination of these.

10. The method of claim 9, wherein the at least one transmission characteristic is RSRP, RSCP, or RSSI, or a combination of these, and further comprising adjusting a threshold value of a respective RSRP, RSCP, or RSSI filter, or a combination of such filters, to trade-off between a probability of generating false alarms and a probability of detection.

11. The method of claim 1, wherein the first scan, or the second scan, or both, include measurements of signal power from an external macrocell/picocell/femtocell.

12. A non-transitory computer readable medium, comprising instructions for causing a computing environment to perform the method of claim 1.

13. A system for determining if a radio node has been relocated, comprising:
   a. a scanner configured to perform a first scan, such that the scanner, for a set of radio nodes connected to a services node, causes the first scan to be performed with respect to a subject radio node to determine a baseline set of transmission characteristics of neighboring radio nodes, the first scan measuring at least one transmission characteristic of a neighboring radio node with respect to the subject radio node;
   b. a detector for detecting if a radio node has been off-line for greater than a first predetermined duration of time;
   c. the scanner, further configured to cause a second scan to be performed with respect to the radio node when the radio node has been off-line for greater than the first predetermined duration of time, the second scan being performed once the radio node is back online, the second scan measuring at least one transmission characteristic of a neighboring radio node; and
   d. a signal transmitter configured to transmit a signal indicating that the radio node that has been off-line for greater than the first predetermined duration of time has been relocated when a determination has been made that the radio node has been relocated by a controller performing the steps of:
      identifying a number (N) of neighboring radio nodes to compare changes in the at least one transmission characteristic;
      calculating a score based on a number of new radio nodes found in the second scan which were not found in the first scan and based on a number of radio nodes not found in the second scan which were found in the first scan and based on a change of the at least one transmission characteristic for one or more of the neighbor nodes between the first scan and the second scan; and determining that the radio node has been relocated when the score is greater than a predetermined threshold.

14. The system of claim 13, wherein the detector includes a clock circuit.

15. The system of claim 13, wherein the first predetermined duration of time is between three and ten minutes.

16. The system of claim 13, wherein the scanner is configured such that the second scan starts following a second predetermined duration of time, the second predetermined duration of time measured from the time that the radio node comes back online.

17. The system of claim 16, wherein the second predetermined duration of time is between one and five minutes.

18. The system of claim 13, wherein the scanner is configured such that the second scan is performed in such a way that successive ones of the set of radio nodes are configured to transmit while each other of the set of radio nodes is configured to not transmit but to measure a result of the transmission.

19. The system of claim 13, wherein the scanner is configured such that the second scan is performed in such a way that successive ones of the set of radio nodes are configured to receive or measure a result of transmissions while each other of the set of radio nodes is configured to transmit or radiate power.

20. The system of claim 13, wherein the at least one transmission characteristic is selected from the group consisting of measurement report messages in 3GPP/3GPP2 specifications.

21. The system of claim 20, wherein the at least one transmission characteristic is Reference Signal Received Power (RSRP), Received Signal Code Power (RSCP), or Received Signal Strength Indication (RSSI), or a combination of these.

22. The system of claim 21, wherein the at least one transmission characteristic is RSRP, RSCP, or RSSI, or a combination of these, and further comprising adjusting a threshold value of a respective RSRP, RSCP, or RSSI filter, or a combination of such filters, to trade-off between a probability of generating false alarms and a probability of detection.

23. The system of claim 13, wherein the scanner is configured such that the first scan, or the second scan, or both, include measurements of signal power from an external macrocell/picocell/femtocell.

* * * * *